United States Patent [19]
Emery

[11] 3,899,729
[45] Aug. 12, 1975

[54] MAXIMUM SPEED CONTROL CIRCUIT FOR A STEPPING MOTOR

[75] Inventor: Arthur Richard Emery, Bristol, Conn.

[73] Assignee: The Superior Electric Company, Bristol, Conn.

[22] Filed: Jan. 16, 1974

[21] Appl. No.: 433,873

[52] U.S. Cl. .............................................. 318/696
[51] Int. Cl. ............................................ G05b 19/40
[58] Field of Search ........................... 318/696, 685

[56] References Cited
UNITED STATES PATENTS

| | | | |
|---|---|---|---|
| 3,411,058 | 11/1968 | Madsen et al. | 318/696 |
| 3,424,961 | 1/1969 | Leenhouts | 318/696 |
| 3,553,549 | 1/1971 | Leenhouts | 318/138 |
| 3,579,279 | 5/1971 | Inaba et al. | 318/696 |
| 3,582,752 | 6/1971 | Steinberg | 318/696 |
| 3,593,097 | 7/1971 | Gebelein | 318/696 |
| 3,742,329 | 6/1973 | Giguere | 318/696 |
| 3,767,990 | 10/1973 | Kreithen et al. | 318/696 |
| 3,806,821 | 4/1974 | Niemeyer et al. | 318/696 |

Primary Examiner—Robert K. Schaefer
Assistant Examiner—John J. Feldhaus
Attorney, Agent, or Firm—Ernest M. Junkins

[57] ABSTRACT

A circuit for supplying pulses to a motor control for a stepping motor with the motor producing an incremental step for each pulse essentially at the frequency of the pulses supplied with the pulses being obtained from a fixed rate oscillator set at about the maximum tolerable rate of the system and with an adjustable delay setting the maximum tolerable pulse rate for each individual application or applications.

8 Claims, 1 Drawing Figure

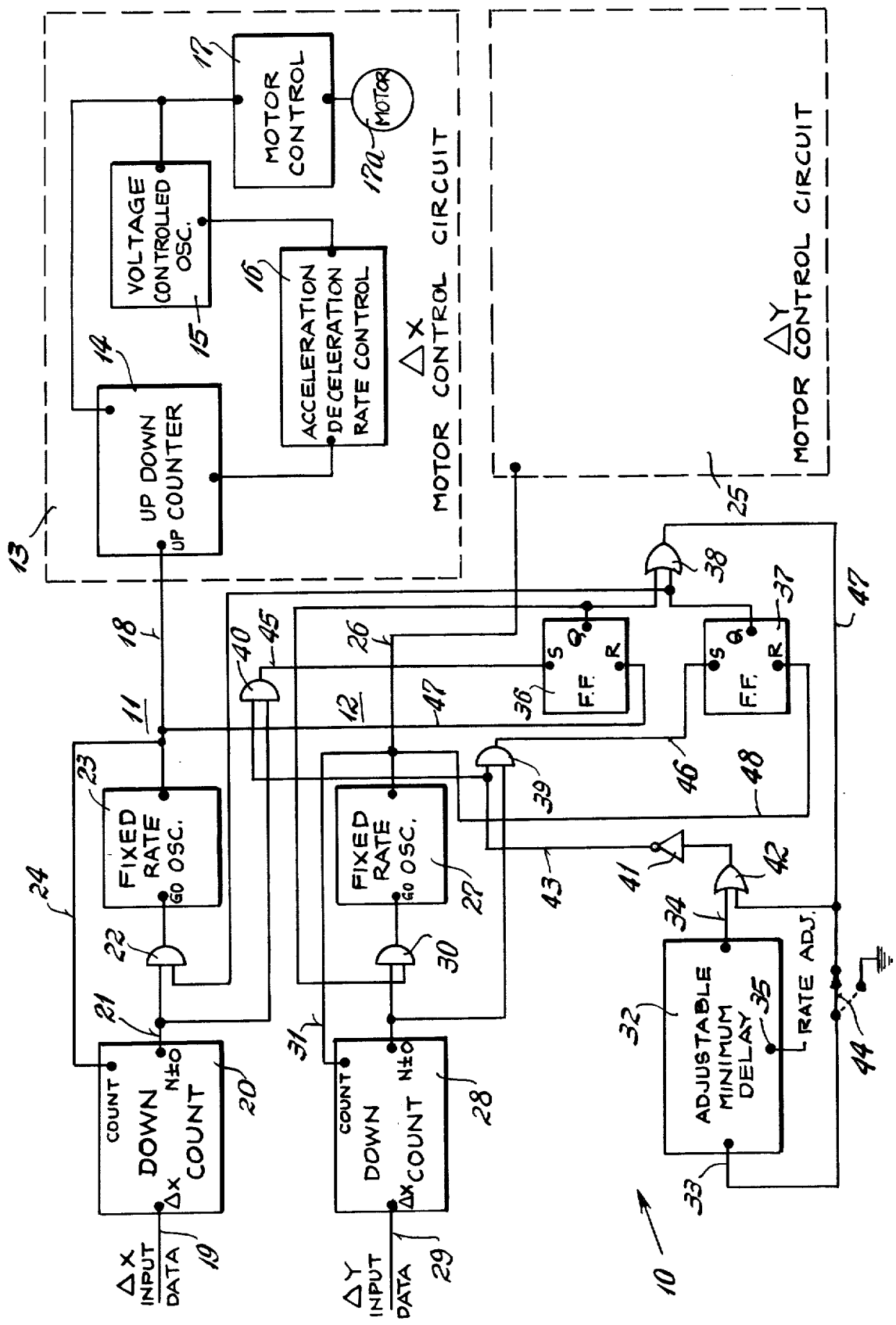

MAXIMUM SPEED CONTROL CIRCUIT FOR A STEPPING MOTOR

The present invention has particular utility when used to control the stepping, both as to extent and speed, of a stepping motor. One type of such a motor control is shown in U.S. Pat. No. 3,411,058 granted Nov. 12, 1968 and assigned to the assignee of the present invention. In such a system, the number of steps desired to be produced by the motor is set as a count in a counter and an oscillator produces a number of pulses equal to the counter count with each pulse effecting a change of energization of the motor windings to produce an incremental step. The motor is initially accelerated by increasing the rate of the pulses and then decelerated by decreasing the pulse rate for the last few steps while the intermediate pulses are produced at the maximum set rate of the oscillator.

If, however, it is more convenient to supply the pulses from a fixed rate oscillator, then these pulses may be introduced as command pulses to a motor control circuit such as shown in U.S. Pat. No. 3,553,549, granted Jan. 5, 1971 and assigned to the assignee of the present invention. This circuit also has a variable rate oscillator to provide acceleration, deceleration and maximum intermediate speeds for the motor.

While such systems have been found extremely satisfactory, they depend upon the maximum motor speed or pulse rate being within the motor's ability to produce a step. If the pulse rate exceeds the ability of the motor to produce a step for each pulse, then the system malfunctions by not having every pulse produce a step. As the system may be used in different applications with each application having a maximum speed and within many applications, the maximum speed varies, depending upon the operation being performed, it has been difficult to positively assure that the maximum speed will not be exceeded either for the application or for an operation within the application and to adjust the maximum rate.

It is an object of the present invention to provide a speed control circuit for use with a stepping motor which assures that the maximum speed of the motor can be initially set and not exceeded.

Another object of the present invention is to provide a speed control for a stepping motor in which the maximum speed that the motor should not exceed may be continuously maintained but in which a lesser maximum speed for different operations may be selected.

A further object of the present invention is to achieve the above objects with a maximum motor speed control system that is relatively economical to manufacture, may be easily incorporated into presently manufactured motor circuits and which is reliable and durable in use.

In carrying out the present invention there is provided as set forth in either of the above-noted patents, a variable rate oscillator which is used to supply pulses to a motor control of a motor control circuit with each pulse changing the energization of the motor windings to produce one step. The oscillator's rate, when producing a train of pulses, initially increases the pulse rate with the first few pulses of the train in order to accelerate the motor to a set maximum intermediate running rate and then decreases the rate of the pulses for the last few pulses in the train to decelerate the motor. The motor, however, runs for the intermediate pulses at the maximum rate at which the oscillator is set.

In order to prevent the pulses to the motor from causing the motor to operate at a speed which is greater than the motor's ability to produce an incremental step for each pulse, the present invention provides pulse rate control that is interposed before the variable oscillator of the motor control for controlling the rate at which the pulses are introduced to the motor control circuit of U.S. Pat. No. 3,553,549 to thereby essentially set the maximum rate at which the pulses may be produced by the motor control circuit for the motor. Specifically the pulse rate control includes a fixed rate oscillator together with an adjustable minimum time delay which sets an adjustable rate at which the fixed oscillator may produce the command pulses to the motor control circuit. Accordingly, while the maximum rate may vary between many different applications, the variable oscillator of the motor control circuit in all applications is set to operate at a fixed maximum rate which rate is equal to the maximum tolerable motor speed for any application. The pulse rate control is then utilized to set the maximum pulse rate to the motor control for each individual application. As the latter is more conveniently adjustable, either manually or automatically, the use thereof enables identical motor control circuits to be used in many different applications as the maximum rate thereof does not have to be individually altered for each application.

On the other hand if in one application, where the motor may operate under two or more conditions, each of which has a maximum tolerable pulse rate, the fixed oscillator of the pulse rate control is set to run at the condition requiring the higher maximum rate while the adjustable minimum delay is set to only enable the fixed oscillator to run at the lower maximum rate for the second condition. In this manner irrespective of the condition under which the motor is operated, it cannot exceed its maximum pulse rate and hence not produce a step for each pulse received by its motor control.

Other features and advantages will hereinafter appear.

Referring to the drawing, the sole FIGURE is a block and diagrammatic sketch of a motor control system having a speed control incorporated therein in accordance with the present invention.

Referring to the drawing, the maximum speed stepping motor control circuit of the present invention is generally indicated by the reference numeral 10 and is shown interconnected to an X axis drive 11 and a Y axis drive 12 such that both are controlled to run at the maximum speed set by the present circuit. The X axis drive 11 included within a block 13 the motor control system disclosed in the above-noted U.S. Pat. No. 3,553,549 and hence has an up-down counter 14 the count of which is utilized to control the rate of a voltage variable oscillator 15 by way of an acceleration and deceleration rate control 16. The output pulses from the oscillator 15 are directed to a motor control 17 which in turn effects changes of energization of the windings of a motor 17a. For each pulse received on an input lead 18 to the system 13, the motor 17a will receive a change of energization. However, the above-noted components effect acceleration and deceleration of the motor while the intermediate rate of the motor is set by the maximum rate at which the oscillator 15 is designed to function. The pulses on the lead 18 may be at a rate which is different than the rate at which the oscillator 15 provides pulses but such a rate is acceptable so long as it is a rate within the range of the counter 14 and the system does not lose a pulse. For long trains of pulses, the rate of the input pulses basically sets the intermediate rate of the oscillator 15.

When it is desired to produce a motor movement having a determined number of steps, the number of steps is entered as input data on a lead 19 to set a ΔX down counter 20 to this number. The counter produces on a terminal 21 an indication that its count is not zero and this information through a gate 22 excites the "go" terminal of a fixed oscillator 23. The output from the oscillator 23 appears on the lead 18 as input pulses to the motor control circuit 13 and also on a lead 24 connected to the count terminal of the counter 20 with each pulse thereat decreasing the count of the counter by one count.

Similarly the Y axis has an identical motor control system 25, a lead 26 connected to the output of a fixed rate oscillator 27, a ΔY down counter 28 and an input lead 29 on which the extent of the movement desired is introduced as a numerical number of pulses. The counter 28 is connected through a gate 30 to the go terminal of the fixed rate oscillator 27 while lead 31 provides a connection from the output of the oscillator 27 to the count terminal of the down counter 28.

Referring to the X axis drive 11 and neglecting the gate 22, the components thereof are those which had previously before the present invention been utilized to translate input data into motor movement. Thus once the down counter 20 is set to the desired count, the fixed rate oscillator 23 produces pulses at a rate which approximates the maximum rate at which the voltage control oscillator 15 is designed to function with the down counter 20 maintaining a count of the difference between the pulses on the lead 18 and the number commanded. When the down counter 20 reaches a zero count the oscillator 23 ceases functioning to produce further pulses and the motor control system continues energizing the motor 17 until the up-down counter 14 also has a zero count. The motor 17 has thus moved the number of steps commanded by the input data.

It will thus be seen that if it is desired to vary the maximum rate of the oscillator 15, that the change must also be made in the rate control 16 and this could effect the acceleration and deceleration rates. Moreover, the rate control is not susceptible to easy manual or automatic changes derived from input data in a numerical control system.

However, as the oscillator 15 has a rate which functions in accordance with the count of the counter 14, Applicant achieves the advantages herein set forth for the present invention by controlling the rate of the pulses on the lead 18 to the system 13 whenever is is desired to produce a lesser maximum rate than the system 13 was set to function. The oscillator 15 tends to run at the rate of the pulses on the lead 18 except for perhaps a small percentage of overshoot at the beginning when a few more pulses are introduced to the counter 18 than are used for acceleration. However, the system 13 settles down to having the rate of the pulses on the lead 18 set the rate at which the oscillator 15 functions so that the latter adjusts its rate to the input pulse rate and the rates are thus essentially equal. Thus the rate of the oscillator 23 is fixed to the maximum tolerable rate.

For controlling lesser operating rates of the system, there is provided an adjustable minimum delay 32 which is basically a monostable circuit in which a pulse or signal on an input terminal 33 produces a pulse or change in voltage levels on its output terminal 34. Upon actuation by an input pulse on its terminal 33, the output terminal voltage level becomes high and remains high until the set time or delay has expired. It then returns to a low voltage level. Only when the output voltage is low, can the next pulse or continuing signal on the lead 33 produce the next high output voltage pulse. The adjustment of the delay is made by the value of a voltage that may be obtained from a manually settable device as, for example, from a variable potentiometer or may be automatically derived from input information and applied to the rate adjustment terminal 35.

The delay 32 may be, as shown, utilized to set to the same lower maximum speed for both the X axis drive oscillator 23 and the Y axis drive oscillator 27 by the use of flip-flops 36 and 37 together with OR gates 38 and 42 and AND gates 39 and 40. In addition, an inverting amplifier 41 is also employed.

In the operation of the circuit 10, the rate adjustment 35 is set for the lower maximum rate desired and input information in the counters 20 and 28 makes the N ≠ 0 terminals of each have a higher voltage. Also the output terminal 34 of the delay 32 is low, i.e., a low voltage, but inverted by inverter 41 so that a lead 43 to each of the AND gates 40 and 39 is high. Thus, output leads 45 and 46 respectively then become high which sets the flip-flops 36 and 37. The change in voltage of the Q terminal of flip-flop 36 to high is applied to the AND gate 30 to thereby actuate the oscillator 27 while the high Q terminal voltage of flip-flop 37 is applied to the AND gate 22 to thereby actuate the oscillator 23. Both oscillators will then produce a pulse on their respective leads 18 and 26, with the former resetting the flip-flop 36 by lead 47 and the latter resetting the flip-flop 37 by lead 48. The flip-flops are capable of being reset as the leads 45 and 46 have become low by the high output from the OR gate 38 through the OR gate 42 and inverter 41 through lead 43 meking their respective inputs to the AND gates 39 and 40 low. Also when the flip-flops are reset their Q terminals change their voltage levels which through the AND gates 22 and 30 deenergize the go terminals of the oscillators 23 and 27, preventing further operation thereof.

The parts so remaining until the flip-flops 36 and 37 have a "set" voltage applied. This, however, cannot occur until the output terminal 34 of the delay 32 goes low at the expiration of the set time. Until then, the output of the gates 42 and 41 on the lead 43 maintains the voltage on the leads 45 and 46 low. However, when this time has expired, the output of gate 42 shifts to high, and the lead 43 to low enabling the flip-flops 36 and 37 to be reset, the go terminals of oscillators 23 and 27 energized and the subsequent production of pulses to the motor control circuits 13 and 25.

It will be understood that the circuit permits a pulse to be produced to the motor control immediately, and uses the pulse to condition the flip-flops to react when the time has expired for which the delay 35 is set. During this time, the oscillators are disabled and hence cannot produce the next pulse.

In using the speed control cirucit of the present invention, preferably, the oscillators 23 and 27 are set at a rate which is the maximum tolerable rate at which the motors may run and which rate is useable in many applications. The adjustable minimum delay, however, is set either manually or automatically to the maximum motor speed for each particular application and will thus be used to control the maximum rate at which the motor runs but yet not interfere with the acceleration or deceleration of the motor.

In some applications, however, where the motor may have one condition where it is desired to operate at a rapid rate and another condition where it may be desired to operate at a much slower rate, the oscillators 23 and 27 may be set to the highest maximum rate and the adjustable minimum delay set to the lower maximum rate. For shifting between the two rates, a switch 44 may be utilized which in its shown position permits the delay 32 to set the maximum rate while in its other position, dotted line, where it is connected to ground enables the maximum rate of the oscillators 23 and 27 to set the speed of the motors by in effect disabling the delay 35 by not permitting it to be actuated and hence cause the counters to directly control their fixed oscillators. One such application is found in numerical control systems where under some conditions the motor may be operated at a transverse rate as in positioning but at a much slower rate when it is milling or cutting. In such a situation the adjustable minimum delay may be set for the maximum cutting speed and irrespective, of any feed rate error in the program, it will maintain the maximum speed to which it is adjusted when in control of the motor. Thus, the motor circuit prevents a programmer if the system is to be operated by tape and run at the maximum rate set by the delay from programming a speed which would be higher than the maximum permitted by the delay. Another error that is prevented is the use of the wrong tape having a higher programmed feed rate. on the other hand, if the motor is to operate at the maximum speed determined by the oscillators 23 and 27 then the switch 44 is actuated to effectively inhibit the delay 32.

If the switch 44 is placed in its dotted line position, the speed of the slower of the two oscillators sets the maximum rate by reason of each oscillator pulse setting its own flip-flop and with both being required to be set in order to enable both oscillators to produce the next pulse. Further, if only one oscillator is set to run, as when there is input data in only one axis, that axis oscillator will run at its own rate irrespective of the rate of the other oscillator.

It will be understood that the adjustable delay and its associated components may be easily mounted on a printed circuit board. Further, that it can be simply plugged into the system without extensive modification of the system.

It will accordingly be understood that there has been disclosed a motor speed control circuit that prevents a stepping motor from functioning at a speed higher than its maximum tolerable speed at which it can operate and still translate each pulse into an incremental movement. The system is used to supply pulses to a motor control circuit which has a variable oscillator that produces command pulses to the motor control and effects acceleration and deceleration of the motor. The maximum rate of the variable oscillator is set for the maximum required for any application and thus can be used for all applications without change. The pulse rate control includes a fixed rate oscillator that has its rate set to the maximum for each individual condition. Further, for applications in which a lower rate is also desired, an adjustable delay is connected which sets the lower maximum rate at which the fixed oscillator can operate. Thus, one or two rates at which the motors may run may be set without alteration in the motor control circuits. Moreover, if desired, the adjustable delay may be used to set the lower maximum speed at which two axes may be simultaneously operated.

Variations and modifications may be made within the scope of the claims and portions of the improvements may be used without others.

I claim:

1. A speed control circuit for use with a motor control means having an input for accepting pulses and translating each pulse received into a change of energization of a stepping motor to produce an incremental movement of the motor, said motor control circuit supplying pulses to the motor control means including a fixed rate oscillator and an adjustable delay means, means setting said fixed rate oscillator to produce pulses at a fixed rate no greater than the maximum rate of the variable rate oscillator means and means interconnecting the adjustable delay means to the fixed rate oscillator to regulate a lesser rate of the pulses produced by the fixed rate oscillator than that to which it is set whereby said motor is prevented from normally stepping at a rate greater than the maximum rate set by the pulses from the speed control circuit.

2. The invention as defined in claim 1 in which there are means for inhibiting the adjustable delay means to enable pulses to be supplied to the motor control means at a rate equal to the fixed oscillator rate.

3. The invention as defined in claim 1 in which there is one output pulse from the means for supplying pulses for each change of energization produced by the variable rate oscillator means.

4. The invention as defined in claim 1 in which there is a second motor control means having a variable rate oscillator means and in which the speed control circuit includes a second fixed rate oscillator for supplying pulses to the second motor control means, means setting said second fixed rate oscillator to have a fixed rate of its pulses no greater than the maximum rate of the variable rate oscillator means of the second motor control means.

5. The invention as defined in claim 4 in which the adjustable delay means is connected to the second fixed rate oscillator and in which said adjustable delay means controls the lesser rate at which the second fixed rate oscillator produces pulses.

6. The invention as defined in claim 5 in which the adjustable delay means controls both fixed rate oscillators to have them produce pulses at the same rate set by the adjustable delay means.

7. The invention as defined in claim 5 in which there is means for preventing the adjustable delay means from controlling the pulse rate of the two fixed rate oscillators, in which the pulse rates of the fixed oscillators are different and in which the speed control circuit includes means for setting the pulse rate from both oscillators to that of the fixed rate oscillator having the lower rate.

8. The invention as defined in claim 7 in which each fixed rate oscillator is responsive to produce pulses only with the receipt of a command signal and in which the speed control circuit includes means for enabling the one fixed rate oscillator having a command signal to supply pulses at its fixed rate when there is no command signal to the other fixed rate oscillator.

* * * * *

UNITED STATES PATENT OFFICE
CERTIFICATE OF CORRECTION

PATENT NO. 3,899,729

DATED : August 12, 1975

INVENTOR(S) : Arthur Richard Emery

It is certified that error appears in the above-identified patent and that said Letters Patent are hereby corrected as shown below:

Column 4, line 41, "meking" should be --making--.

Claim 1, column 6, line 16, omit "circuit supplying pulses to the motor control"; line 17, "fixed" should be --variable--; same line before "and" insert --means for setting the rate at which the changes of energization occur and having a maximum rate, said speed control circuit supplying pulses to the motor control means including a fixed rate oscillator--

Signed and Sealed this fourth Day of November 1975

[SEAL]

Attest:

RUTH C. MASON
Attesting Officer

C. MARSHALL DANN
Commissioner of Patents and Trademarks